(No Model.)
G. D. PHIPPEN & J. H. BROWNE.
COUPON CUTTER.
No. 417,366. Patented Dec. 17, 1889.
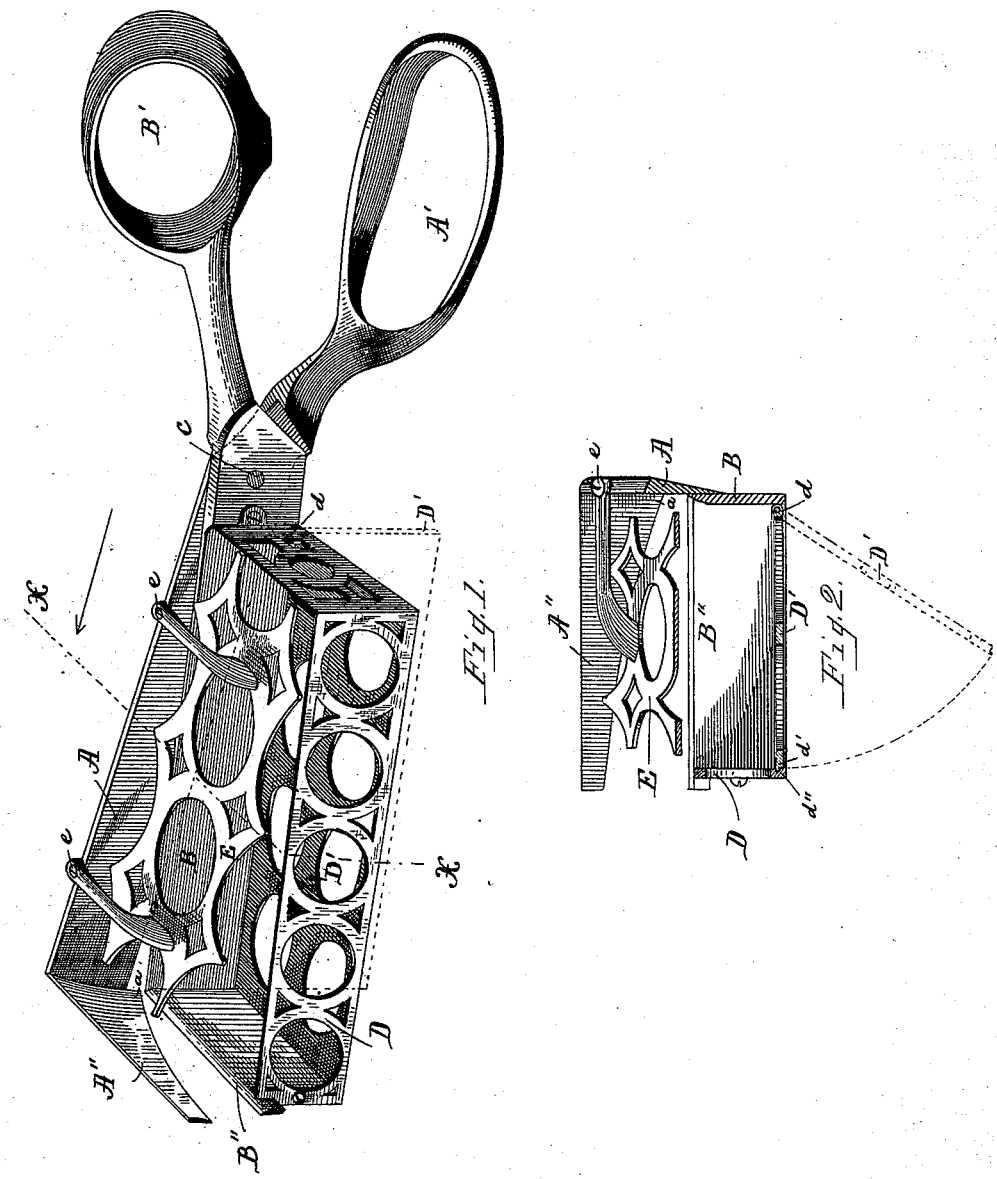

UNITED STATES PATENT OFFICE.

GEORGE D. PHIPPEN AND JOSIAH H. BROWNE, OF SALEM, MASSACHUSETTS.

COUPON-CUTTER.

SPECIFICATION forming part of Letters Patent No. 417,366, dated December 17, 1889.

Application filed April 23, 1889. Serial No. 308,308. (No model.)

*To all whom it may concern:*

Be it known that we, GEORGE D. PHIPPEN and JOSIAH H. BROWNE, citizens of the United States, and residents of Salem, in the county of Essex and State of Massachusetts, have jointly invented new and useful Improvements in Coupon-Cutters, of which the following, taken in connection with the accompanying drawings, is a specification.

This invention relates to improvements in coupon-cutters; and it consists, in connection with a pair of right-angled shears adapted to make two cuts—one at a right angle to the other—of a basket or receptacle, made of any suitable material, attached to one of the cutting-blades and adapted to receive the coupons as they are cut from the bond or sheet, a movable cover attached to and moving with one of the blades, and a hinged or movable bottom on said basket, for the purpose of facilitating the removal of the coupons from such basket or receptacle when it is desired to empty the latter, as will hereinafter be more fully shown and described, reference being had to the accompanying drawings, where—

Figure 1 represents a perspective view of the improved coupon-cutters, showing the shears partly open; and Fig. 2 represents a cross-section on the line X X. (Shown in Fig.1.)

Similar letters refer to similar parts wherever they occur on the different parts of the drawings.

In the drawings, A and B represent a pair of shears, pivoted together at *c* and provided with the respective handles A' and B', as usual.

Made in one piece with or suitably secured to the ends of each of the blades A B are the respective right-angle blades or lateral cutters A'' and B'', one of which—preferably the upper blade A''—being provided at the junction of the longitudinal cutter A with a projecting lip or nose *a*, so as to cause the lateral blades A'' B'' to commence acting on the coupon or paper to be cut before the blades A and B have been fully closed, thus causing a clean right-angle cut to be made without tearing the paper or coupon.

In connection with the device, we use a basket or coupon-receptacle D, secured in any suitable manner to the lower blades B B'', as shown in the drawings, or it may be secured to the handle portion B', if so desired, without departing from the essence of the invention. The said basket or coupon-receptacle has a bottom D', which is made removable from said basket, it being for this purpose preferably pivoted, at *d*, to the basket, as shown in the drawings, or to the blades B B'', as may be desired.

While the shears are being used the bottom D' is held in a closed position relative to the basket D, as shown in full lines in Figs. 1 and 2, preferably by means of a lip *d'* on the bottom D', adapted to lock into a notch or recess *d''* on the basket D, as shown in Fig. 2; but this particular locking device is not essential, as any kind of a clasp or locking device may be used for the purpose of securing the said bottom to the basket and holding it in such a position while the shears are being used for cutting off the coupons or pieces of paper, &c.

To the shear-blade A is secured in a detachable manner, preferably by means of screws *e e*, the basket-cover E, as shown in the drawings, which serves the purpose of retaining the detached coupons within the basket D when the shears are closed, and thus preventing their being shaken out or blown about if the person in charge has to leave the work temporarily.

In using this improved coupon-cutter the operator holds the bond or sheet in one hand, while with his other hand he guides the shears in such a manner as to sever the coupon on the right-angled lines or divisions usually existing on bonds or coupon-bearing sheets. The coupon, as it is being cut off, falls into the basket D, and by successively operating the device the coupons are caused to lie on top of each other in their proper order within said basket. After the desired coupons, &c., have been cut off they are removed from within said basket D simply by swinging open the bottom D', as shown in dotted lines in Figs. 1 and 2, allowing the coupons to drop on the desk or table in the successive order in which they were cut off.

The basket D, as well as its bottom D' and the cover E, are preferably made grated or perforated, as shown, so as to be as light as possible consistent with strength, and the cover E being perforated, also, for the purpose of enabling the person in charge to guide the cutters properly relative to the bond or sheet that is being cut, and thus to ascertain the progress of the work.

The basket D and cover E are preferably made detachable from their respective blades, so as to facilitate the grinding and sharpening of the latter from time to time, as may be needed.

The bottom D' is preferably hinged, as shown; but it may be removable or detachable from the basket D in any other suitable or equivalent manner.

The advantages of this improved coupon-cutter are that as the coupons are severed from the bond they automatically drop into the basket or receptacle, and are inclosed therein by the movable cover after the shears are closed, thus enabling the operator, if he should so desire, to leave his work at any time without danger of disarranging or losing the detached coupons. The device also serves as a ready means for carrying the detached coupons within the basket from one part of the office, room, or building to another, if it should be so desired.

By opening or removing the bottom D' the basket is emptied, allowing the coupons to drop out in the order and rotation in which they have been cut off.

What we wish to secure by Letters Patent and claim is—

1. The coupon-cutter, as described, consisting of the pivoted angular cutter-blades, combined with a basket or receptacle secured to one of the said blades, and provided with a removable bottom, substantially as and for the purpose set forth.

2. The coupon-cutter, as described, consisting of the pivoted angular cutter-blades, combined with a basket or receptacle secured to one of said blades and provided with a removable bottom, and a cover secured to the other blade, substantially as and for the purpose set forth.

3. The coupon-cutter, as described, consisting of the pivoted angular cutter-blades, combined with a detachable cover secured to one of said blades and a detachable basket or receptacle secured to the other blade, substantially as and for the purpose set forth.

In testimony whereof we have signed our names to this specification, in the presence of two subscribing witnesses, on this 20th day of April, A. D. 1889.

GEORGE D. PHIPPEN.
JOSIAH H. BROWNE.

Witnesses:
CHARLES E. BURNS,
JOHN B. CHAMBERLAIN.